United States Patent
Jain

(10) Patent No.: US 11,126,571 B2
(45) Date of Patent: Sep. 21, 2021

(54) USING UNIKERNELS TO DESIGN HIGH PERFORMANCE INTEGRATION WORKFLOWS

(71) Applicant: SAP SE, Walldorf (DE)

(72) Inventor: Shashank Mohan Jain, Karnataka (IN)

(73) Assignee: SAP SE, Walldorf (DE)

( * ) Notice: Subject to any disclaimer, the term of this patent is extended or adjusted under 35 U.S.C. 154(b) by 31 days.

(21) Appl. No.: 16/777,062

(22) Filed: Jan. 30, 2020

(65) Prior Publication Data

US 2021/0240640 A1 Aug. 5, 2021

(51) Int. Cl.
*G06F 13/12* (2006.01)
*G06N 20/00* (2019.01)
*G06F 9/50* (2006.01)
*H04L 29/08* (2006.01)
*G02B 6/293* (2006.01)
*H04L 29/06* (2006.01)

(52) U.S. Cl.
CPC ....... *G06F 13/122* (2013.01); *G02B 6/29382* (2013.01); *G06F 9/505* (2013.01); *G06N 20/00* (2019.01); *H04L 67/02* (2013.01); *H04L 69/16* (2013.01)

(58) Field of Classification Search
CPC ....... G06F 13/122; G06F 9/505; G06N 20/00; G02B 6/29382; H04L 67/02; H04L 69/16
See application file for complete search history.

(56) References Cited

U.S. PATENT DOCUMENTS

| | | | |
|---|---|---|---|
| 10,547,456 B1* | 1/2020 | Liljenstolpe | H04L 9/3247 |
| 2017/0364377 A1* | 12/2017 | Koller Jemio | G06F 9/45533 |
| 2018/0046446 A1* | 2/2018 | Turovsky | G06F 8/71 |
| 2018/0129539 A1* | 5/2018 | Sadat | G06F 9/45558 |
| 2018/0165110 A1* | 6/2018 | Htay | G06F 8/65 |
| 2018/0260259 A1* | 9/2018 | Dawson | G06F 9/542 |
| 2019/0020711 A1* | 1/2019 | Alfieri | H04L 67/1008 |
| 2019/0171460 A1* | 6/2019 | Folco | G06F 9/30145 |
| 2019/0229983 A1* | 7/2019 | Govindaraju | G06F 8/61 |
| 2020/0026578 A1* | 1/2020 | Chuppala | G06F 9/5005 |
| 2020/0042365 A1* | 2/2020 | Tanna | G06F 9/465 |
| 2020/0371846 A1* | 11/2020 | Halen | G06F 9/5027 |
| 2021/0006543 A1* | 1/2021 | Deshpande | H04L 63/0263 |
| 2021/0105178 A1* | 4/2021 | K | H04L 41/0668 |

* cited by examiner

*Primary Examiner* — Henry Tsai
*Assistant Examiner* — Aurangzeb Hassan
(74) *Attorney, Agent, or Firm* — Buckley, Maschoff & Talwalkar LLC

(57) ABSTRACT

According to some embodiments, an integration system may include a source data store that contains a plurality of workloads (e.g., data packets). A processing platform may retrieve a workload from the source data store via first unikernel-based workload processing. The processing platform may then process the workload (e.g., filtering or dropping) to generate an output result and arrange for the output result to be provided to a sink destination via second unikernel-based workload processing (e.g., associated with a Linux event loop model of input output multiplexing). In some embodiments, the processing platform initially evaluates the workload in the source data store to determine if the workload meets a predetermined condition. If the workload does not meet the predetermined condition, the retrieving and arranging may be performed via container-based workload processing instead of unikernel-based workload processing.

19 Claims, 13 Drawing Sheets

USING UNIKERNELS TO DESIGN HIGH PERFORMANCE INTEGRATION WORKFLOWS

BACKGROUND

An integration system may process workloads, such as packets of information. The workloads may be taken from a source data store, processed to generate an output result, and the output result may be sent to a sink data store. Moreover, a processing platform typically has cache elements to improve the performance of the integration system. In some situations, however, the processing of a workload may cause the contents of a cache elements to be deleted or flushed (e.g., when a change in processor context is needed to process a workload) which can substantially degrade the performance of the integration system (especially for certain types of workload packets associated with integration workflows). It would therefore be desirable to provide high performance workload processing in an automatic and efficient manner.

SUMMARY

According to some embodiments, an integration system may include a source data store that contains a plurality of workloads (e.g., data packets). A processing platform may retrieve a workload from the source data store via first unikernel-based workload processing. The processing platform may then process the workload (e.g., filtering or dropping) to generate an output result and arrange for the output result to be provided to a sink destination via second unikernel-based workload processing (e.g., associated with a Linux event loop model of input output multiplexing). In some embodiments, the processing platform may initially evaluate the workload in the source data store to determine if the workload meets a predetermined condition. If the workload does not meet the predetermined condition, the retrieving and arranging may be performed via container-based workload processing instead of unikernel-based workload processing.

Some embodiments comprise: means for retrieving, by a computer processor of a processing platform, a workload from a source data store via first unikernel-based workload processing; means for processing, by the computer processor of the processing platform, the workload to generate an output result; and means for arranging, by the computer processor of the processing platform, for the output result to be provided to a sink destination via second unikernel-based workload processing.

Some technical advantages of some embodiments disclosed herein are improved integration systems and methods to provide high performance workload processing in an automatic and efficient manner.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
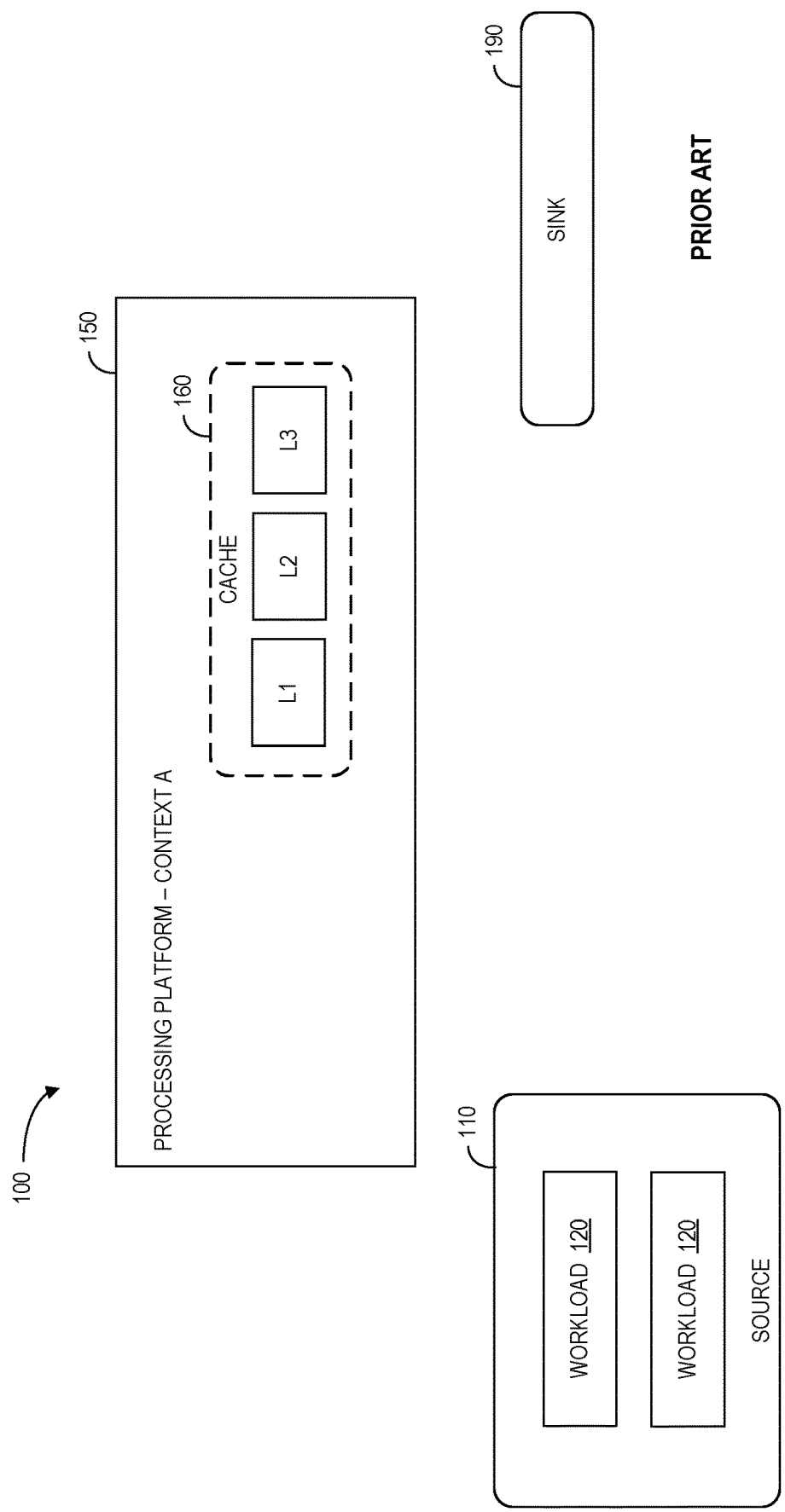
FIG. 1 is a high-level block diagram of a workload processing integration system.

FIG. 1 is a high-level block diagram of a workload processing integration system 100. The integration system 100 includes a source data store 110 containing a number of workloads 120. A processing platform 150 (e.g., associated with a Central Processing Unit ("CPU")) may process those workloads 110. Note that to improve performance, the processing platform 150 may include "cache" elements 160 that locally store copies of information that may be likely to be accessed in the future. Examples of cache elements 160 include a primary or Level 1 ("L1") cache, a Level 2 ("L2") cache, Level 3 ("L3") cache, a Translation Lookaside Buffer ("TLB"), etc. In general, the cache elements may act to reduce the average cost (in terms of time or energy) to access data from a main memory. The cache elements 160 may comprise smaller, faster memory, located closer to a processor core, which stores copies of the data from frequently used main memory locations. The processing platform 150 may execute in a particular context (e.g., "Context A" as illustrated in FIG. 1. As used herein, the term "context" may refer to whether the CPU is operating in, for example, a kernel space or userspace. Eventually, an output result of processing a workload 120 will be provided to a sink destination 190.

Figure 2:
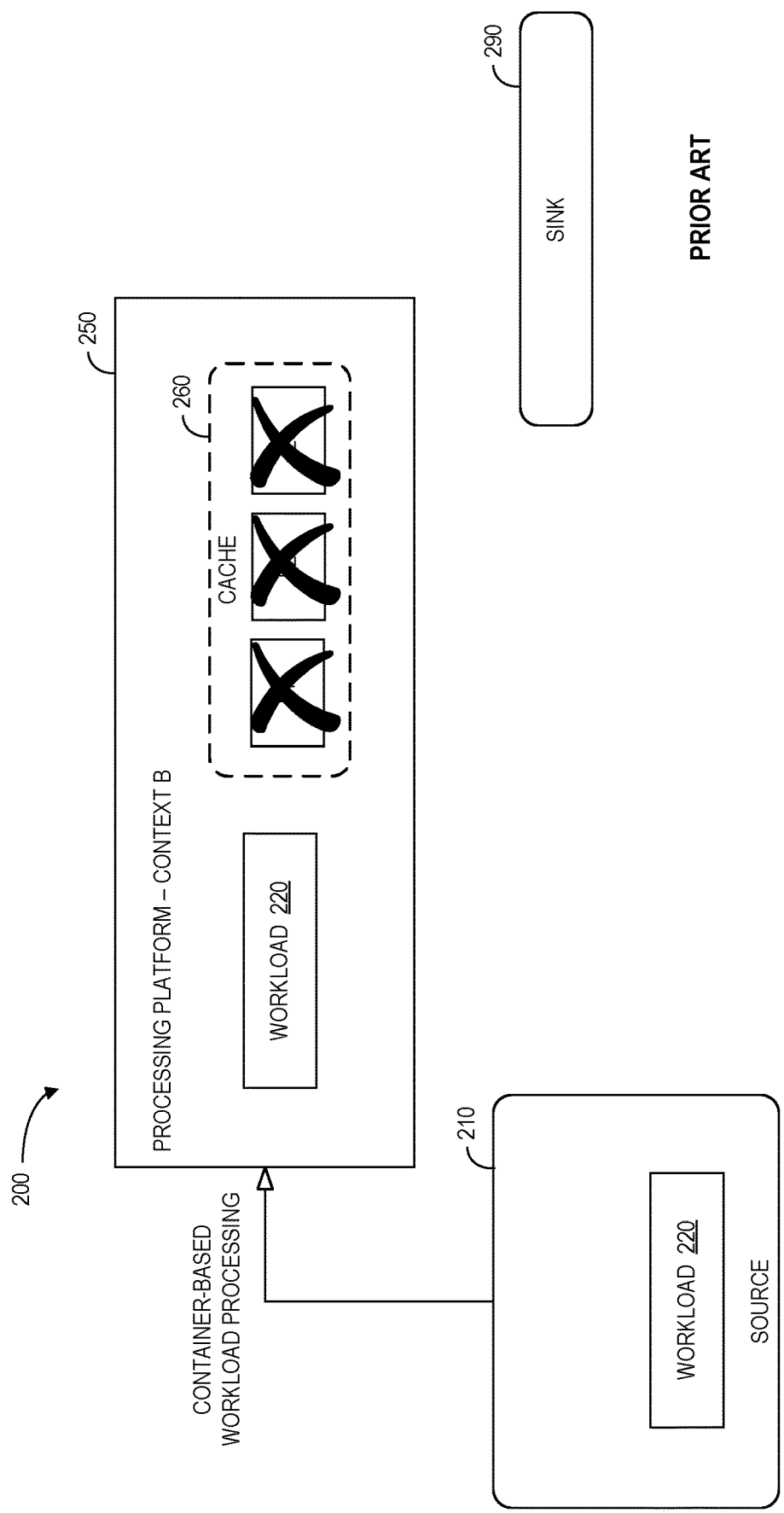
FIG. 2 is diagram of a workload moving from a source data store to a processing platform via container-based workload processing.

FIG. 2 is diagram 200 of a workload 220 moving from a source data store 210 to a processing platform 250 via container-based workload processing. Note that integration as a domain may substantially involve taking workloads 220 from a source data store 210, processing the workloads 220 (e.g., processing associated with filter, drop, etc.), and then invoking another outbound system as a sink destination 290. Currently, approaches depend on container-based technologies. A problem with these approaches is that since container runs as a Linux process, or a set of processes, and is primarily a userspace technology (more or less a general purpose technology for all workloads). Because integration workloads 220 are more Input Output ("IO") bound, they involve a substantial amount of data movement as compared to CPU processing. That is, containers are not optimized to run these type of integration workloads 220. Consider, for example, the data path of a simple integration flow that takes data from a Hyper-Text Transport Protocol ("HTTP") endpoint, applies a particular filter, and then pushes the data to another HTTP endpoint. Initially, the packet will be accepted at the network stack and then copied to userspace for the HTTP server to process. This involves a context switch (e.g., from "Context A" to "Context B" as illustrated in FIG. 2). Because of the context switch, the cache elements 260 need to be cleared (as illustrated with an "X" in FIG. 2) because the information is not applicable to the new context. This clearing of CPU cache elements 260 will substantially impact the performance of the integration system. Also, note that although memory mapping of a socket is possible, it is rarely performed and there is a data copy involved to userspace from the socket.

Figure 3:
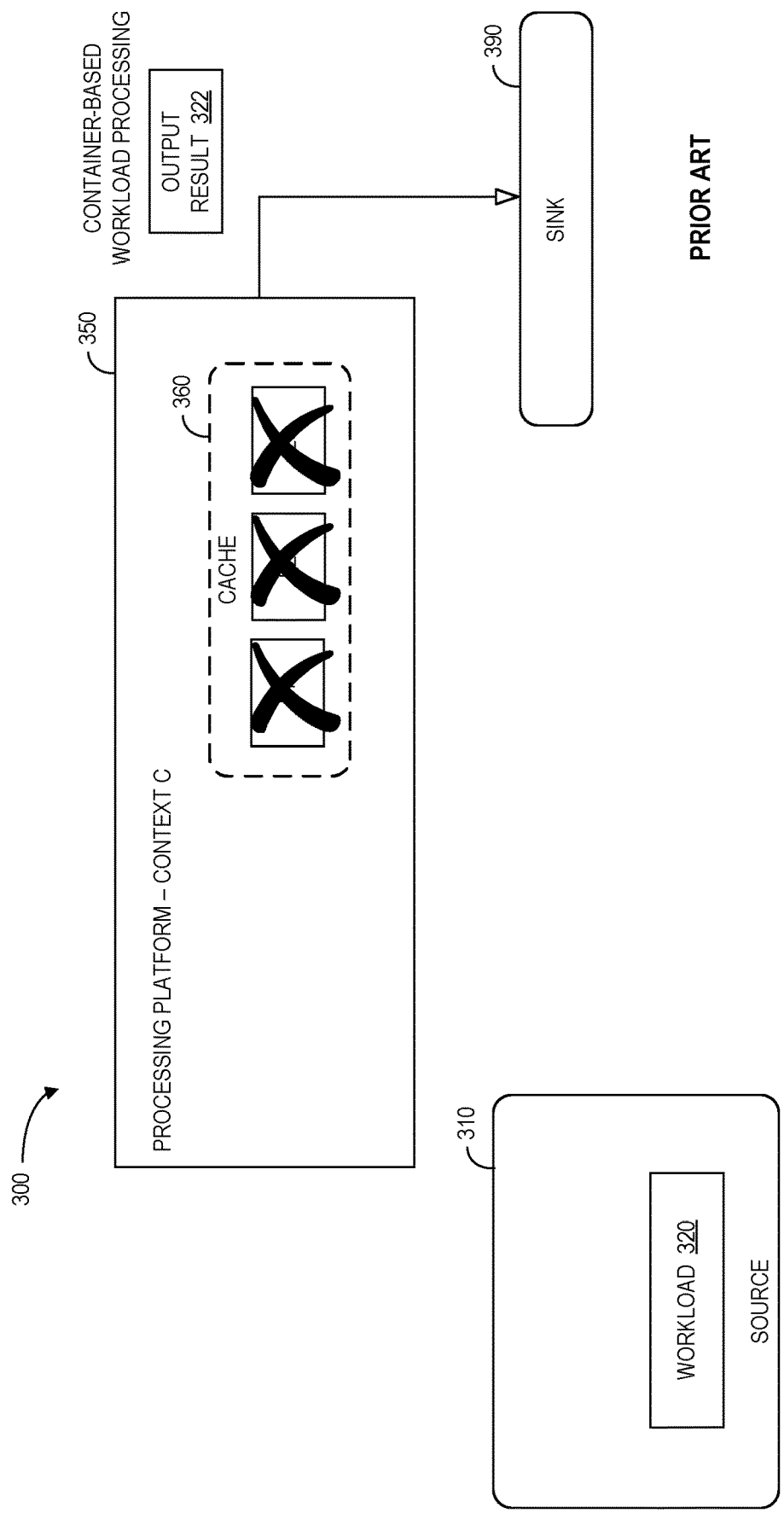
FIG. 3 is a diagram of a workload moving from a processing platform to a sink via container-based workload processing.

FIG. 3 is a diagram 300 of a workload 320 (from a source 310) output result 322 (e.g., after processing) moving from a processing platform 350 to a sink destination 390 via another container-based workload processing. That is, after a packet is processed (filtered or dropped) a connection is again opened to send it outbound to the sink 390. This again leads to copying the data from userspace to kernel and has a context switch to kernel (e.g., from "Context B" to "Context C" as illustrated in FIG. 3) to send data outbound. This again wastes CPU cycles and also flushes out the CPU cache elements 360. Since the nature of the data nature is often the same (e.g., as would be the case for an HTTP request), a lot of data structures will be brought into CPU cache lines. But with every request handling there are at least two context switches (and CPU cache element 360 flushing) for even a very simple integration flow. This approach degrades integration system performant because it wastes a lot of CPU cycles (and is also not a cache oblivious solution).

Figure 4:
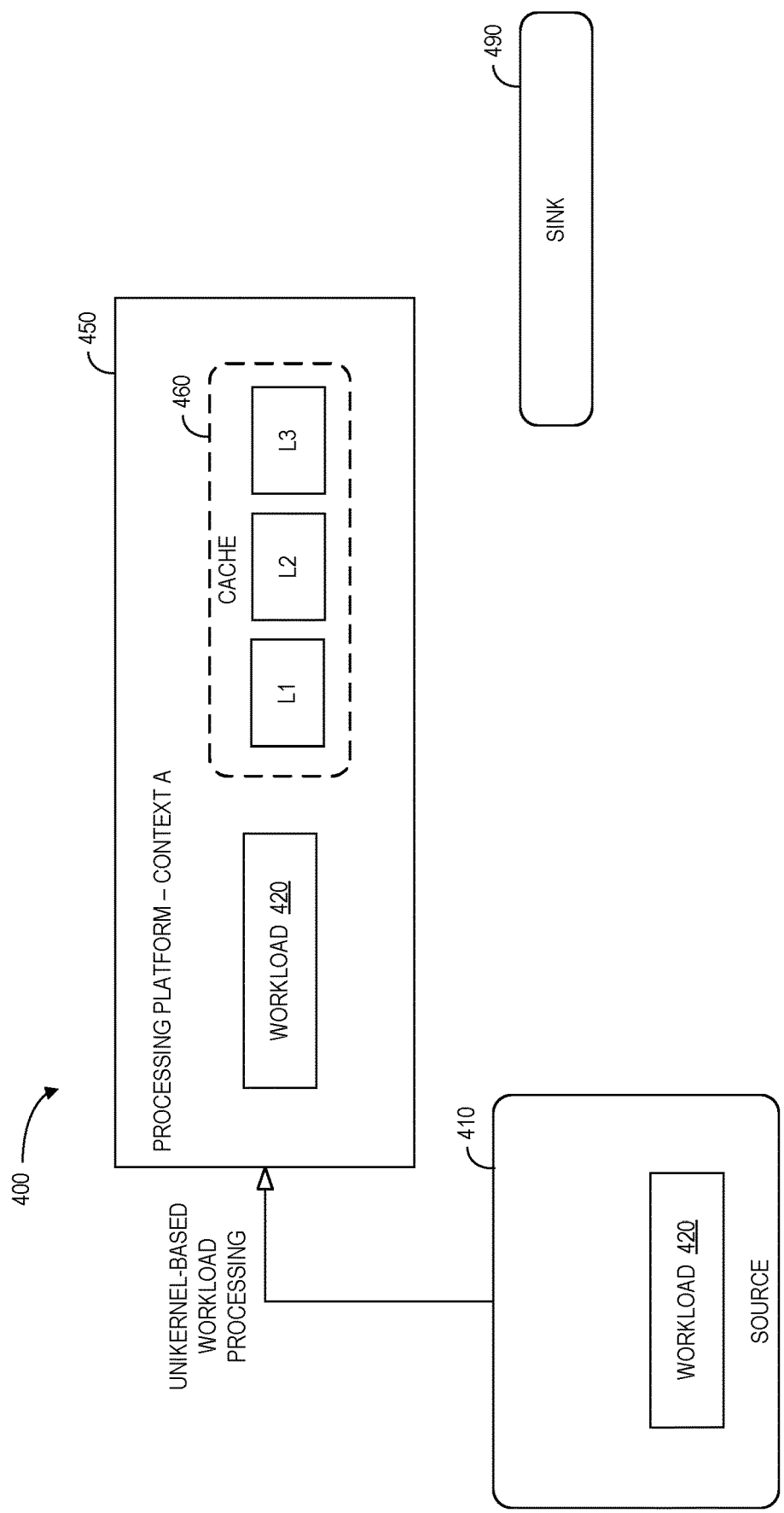
FIG. 4 is diagram of a workload moving from a source data store to a processing platform via unikernel-based workload processing in accordance with some embodiments.

Some embodiments described herein model each integration flow as a "unikernel" instead of as a container-based solution. As used herein, the term "unikernel" may refer to a specialized, single-address-space machine image made from library operating systems (and may be built from high-level languages that are compiled into application machine images). FIG. 4 is a high-level block diagram of a workload processing integration system 400. As before, the integration system 400 includes a source data store 410 containing a number of workloads 420. A processing platform 450 (e.g., associated with a CPU) may process those workloads 410. Note that to improve performance, the processing platform 450 may include cache elements 460 (L1, L2, L3, TLB, etc.) that locally store copies of information that may be likely to be accessed in the future. The processing platform 450 may execute in a particular context (e.g., "Context A" as illustrated in FIG. 4. Eventually, an output result of processing a workload 420 will be provided to a sink destination 490.

The unikernel may be based on, for example, an event loop-based model of IO multiplexing so that it can support a lot of concurrent executions. Because the unikernel is a single address space solution, the boundaries of the kernel and the userspace are not separated. A per tenant unikernel may be utilized which also lets the integration system build the right security primitives. The workload 420 packet is accepted at the network stack and, since there is single address space, the userspace handler can just be like a function call to process the data. This doesn't involves a context switch (and the CPU cache elements 460 remain hot).

As used herein, devices, including those associated with the integration system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The processing platform 450 may store information into and/or retrieve information from various data stores, which may be locally stored or reside remote from the processing platform 450. Although a single processing platform 450 is shown in FIG. 4, any number of such devices may be included. Moreover, various devices described herein might be combined according to embodiments of the present invention. For example, the processing platform 45 and source 410 might be collocated or combined. The integration system 400 may be associated with a constellation of networked apparatuses, such as in a distributed processing or cloud-based architecture.

An operator or administrator may access the integration system 400 via a remote device (e.g., a Personal Computer ("PC"), tablet, or smartphone) to view information about and/or manage operational information in accordance with any of the embodiments described herein. In some cases, an interactive graphical user interface display may let an operator or administrator define and/or adjust certain parameters (e.g., to implement various rules and policies) and/or provide or receive automatically generated recommendations or results from the integration system 400.

Figure 5:
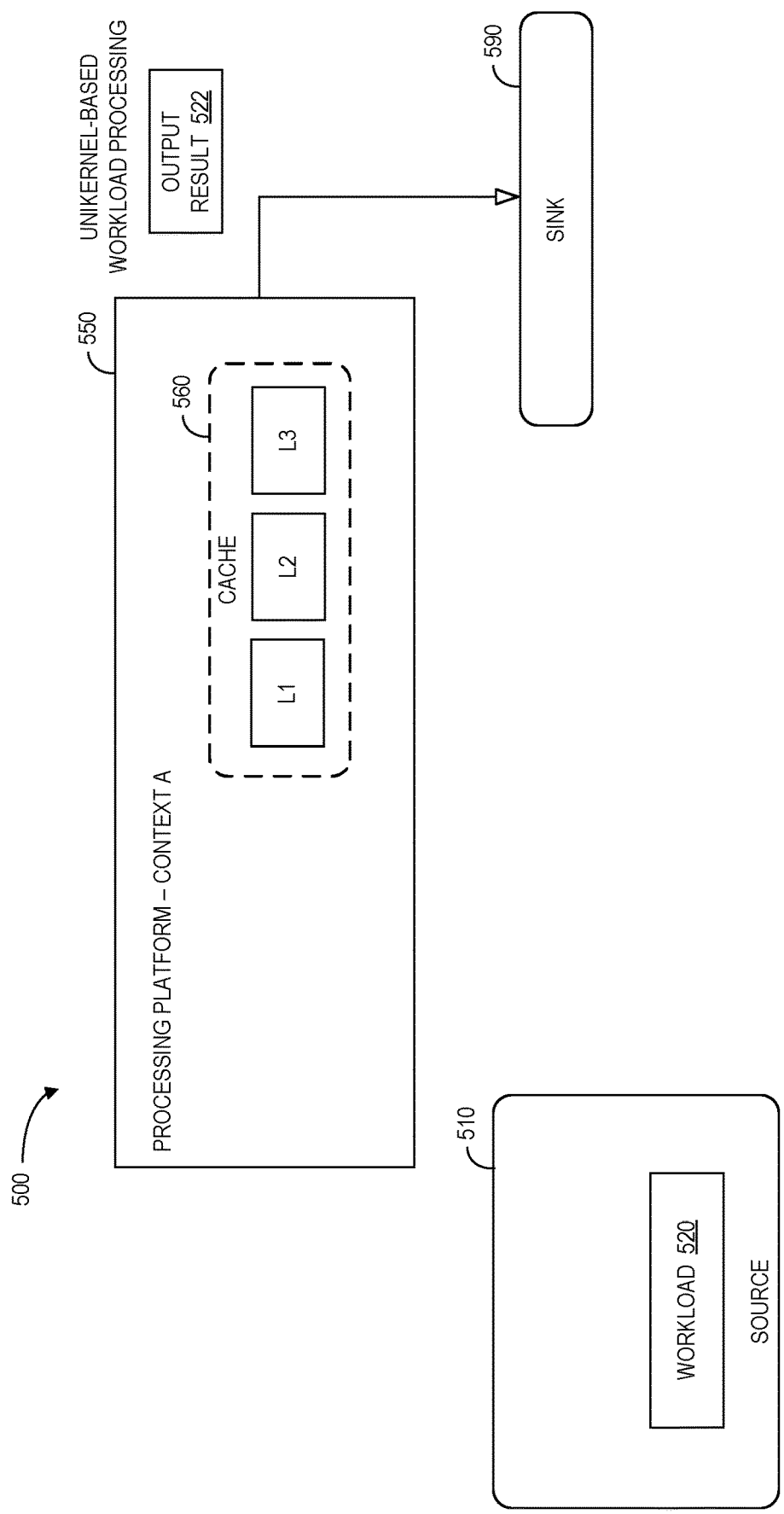
FIG. 5 is a diagram of a workload moving from a processing platform to a sink via unikernel-based workload processing according to some embodiments.

FIG. 5 is a diagram 500 of a workload 520 (from a source 510) output result 522 (e.g., after processing) moving from a processing platform 550 to a sink 590 via unikernel-based workload processing according to some embodiments. After the workload 520 packet is processed (e.g., filtered or dropped), userspace code invokes another function (and there is no system call because it is the same address space and everything runs in same CPU ring 0) to send the output result 522 packets outbound to the sink 590. So again, there is no context switch (e.g., the processing platform remains in "Context A" as illustrated in FIG. 5), and the approach will be friendly to the hardware in terms of CPU cache elements 560 (e.g., L1, L2, and L3). According to some embodiments, this would also avoid TLB flushes because no page table switch happens. Similar results may be provided when an integration flow needs local persistence. That is, this will also manifest itself as a function call instead of a system call.

Figure 6:
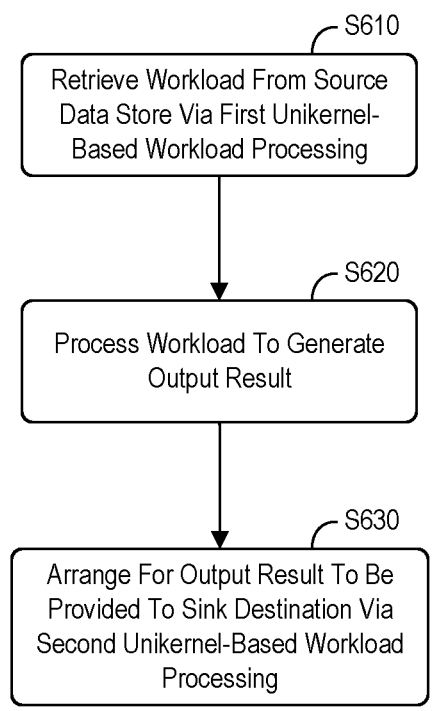
FIG. 6 is a method in accordance with some embodiments.

FIG. 6 is a method that might performed by some or all of the elements of any embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

At S610, a computer processor of a processing platform may retrieve a workload from a source data store via first unikernel-based workload processing. According to some embodiments, the workload is associated with an integration workflow (e.g., an IO packet accepted at a network stack). Note that the source data store might be associated with a first HTTP endpoint while the sink destination is associated with a different HTTP endpoint.

At S620, the computer processor of the processing platform may process the workload to generate an output result. According to some embodiments, the processing may be associated with filtering and/or dropping (e.g., in connection with packet processing).

At S630, the computer processor of the processing platform may arrange for the output result to be provided to the sink destination via second unikernel-based workload processing. According to some embodiments, the unikernel-based workload processing is associated with a Linux event loop model of IO multiplexing. Moreover, a per tenant approach may, according to some embodiments, let the processing platform build appropriate security primitives associated with the workload.

Thus, for an IO-based workload, embodiments may automatically adapt to the appropriate execution environment (e.g., unikernel-based workload processing with an event loop). Note however, that different approaches may be appropriate for different workloads. Thus, according to some embodiments, a computer processor of a processing platform may initially evaluate a set of workloads in a source data store to determine if the set of workloads meets a predetermined condition. If the workload does not meet the predetermined condition, the workload retrieving and arranging might be performed via container-based workload processing instead of unikernel-based workload processing. Moreover, according to some embodiments the evaluation may be based on a Machine Learning ("ML") algorithm. As used herein the term "machine learning" may refer to various Artificial Intelligence ("AI") techniques including those associated with supervised learning, unsupervised learning, reinforcement learning, self learning, feature learning, sparse dictionary learning, etc. Examples of machine learning algorithms include artificial neural networks, decision trees, Support Vector Machines ("SVM"), regression analysis, Bayesian networks, genetic algorithms, etc.

Figure 7:
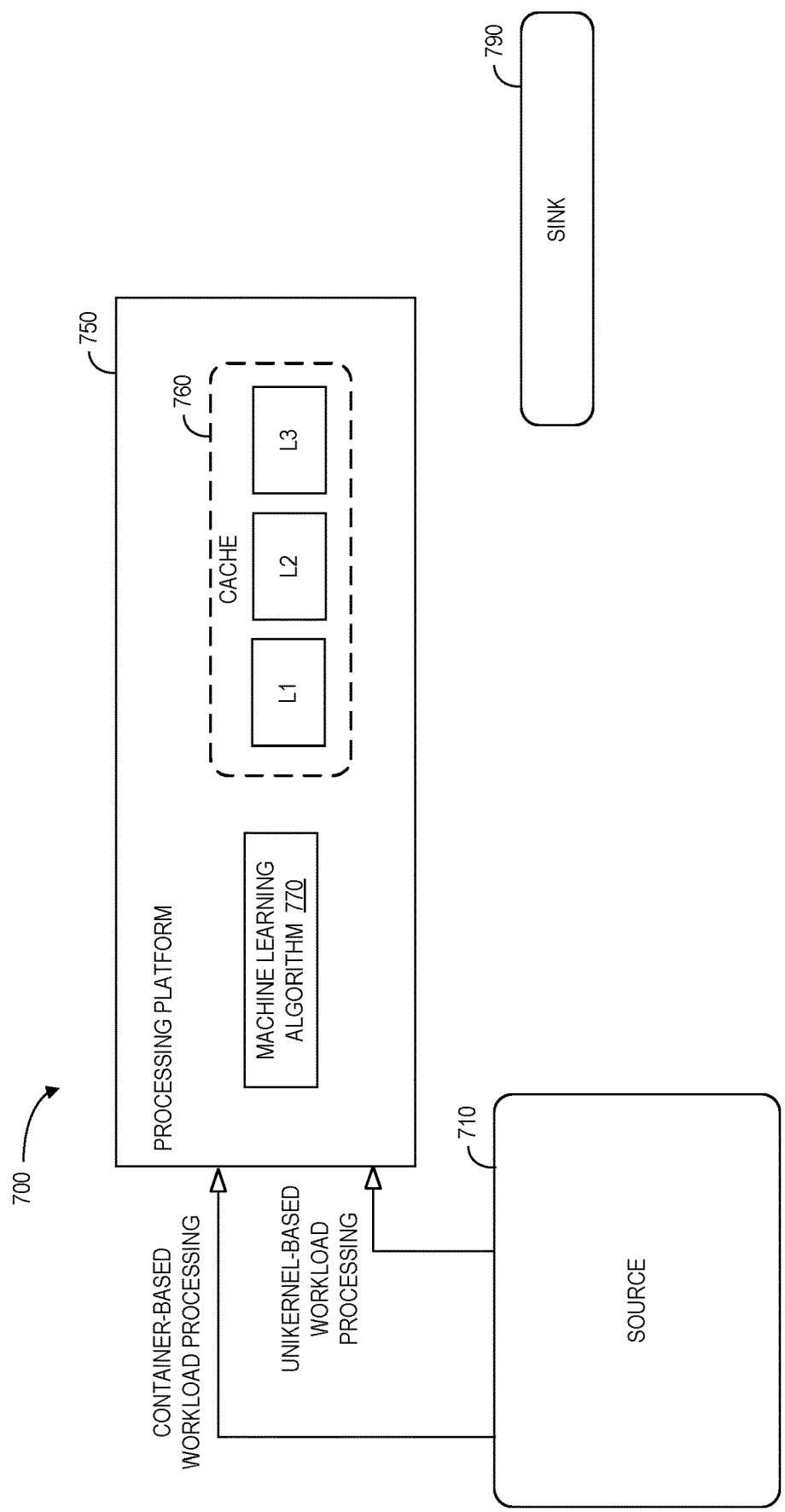
FIG. 7 is diagram of workloads moving from a source data store to a processing platform via container and unikernel-based workload processing according to some embodiments.

FIG. 7 is a high-level block diagram of a workload processing integration system 700. As before, the integration system 700 includes a source data store 710 containing a number of workloads. A processing platform 750 (e.g., associated with a CPU) including cache elements 760 may process those workloads. Eventually, an output result of processing a workload 720 will be provided to a sink destination 790. In this embodiment, the processing platform 750 includes a machine learning algorithm 770 that analyzes the source data store 710 and determines if container-based on unikernel-based workload processing would be more appropriate for that particular set of workloads. The unikernel approach may be based on, for example, an event loop-based model of IO multiplexing so that it can support a lot of concurrent executions.

Figure 8:
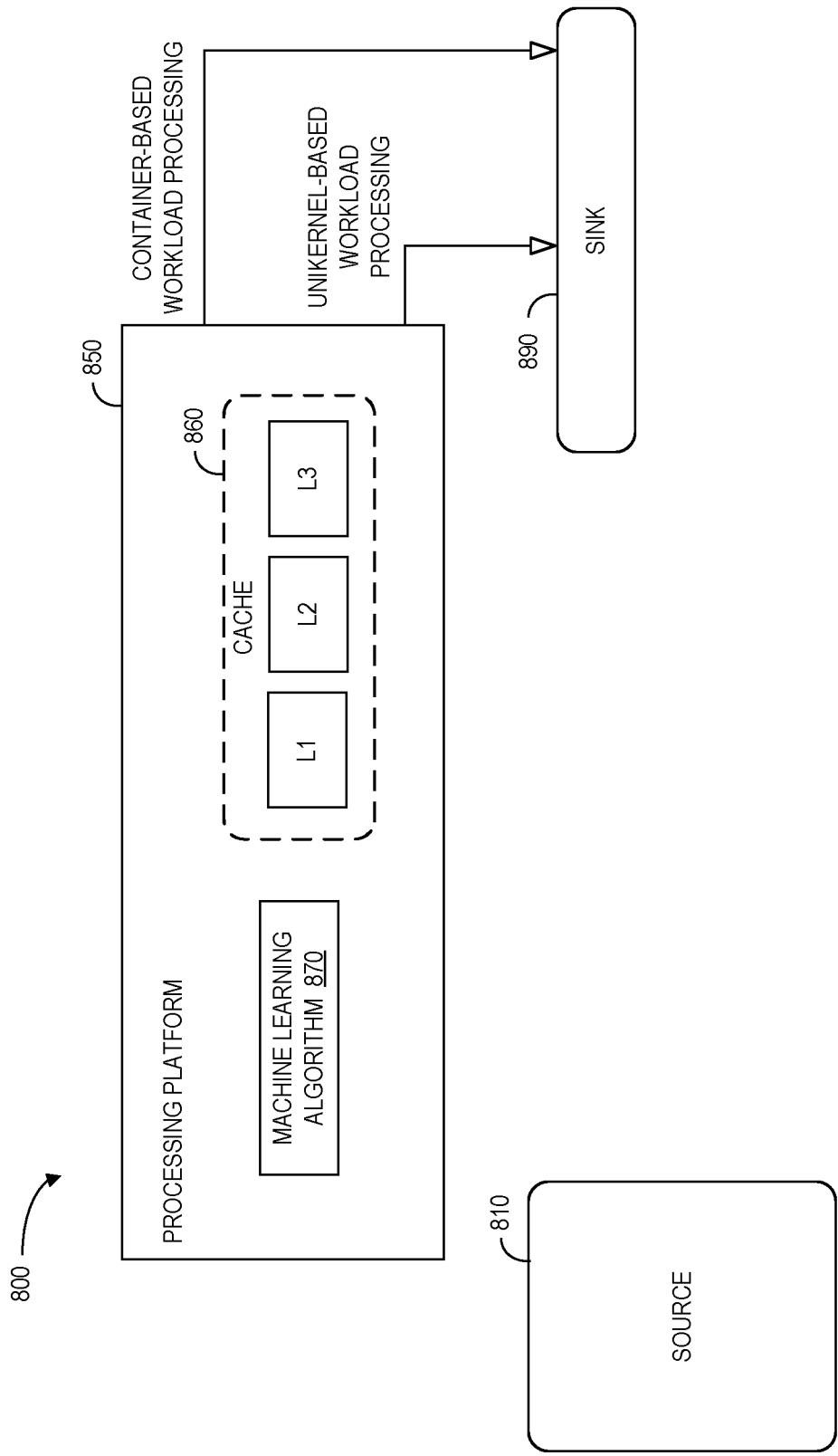
FIG. 8 is a diagram of workloads moving from a processing platform to a sink via unikernel and container-based workload processing in accordance with embodiments.

FIG. 8 is a diagram 800 of a workload (from a source 810) output result (e.g., after processing) moving from a processing platform 850 to a sink 890 via either container-based or unikernel-based workload processing as determined by a machine learning algorithm.

Figure 9:
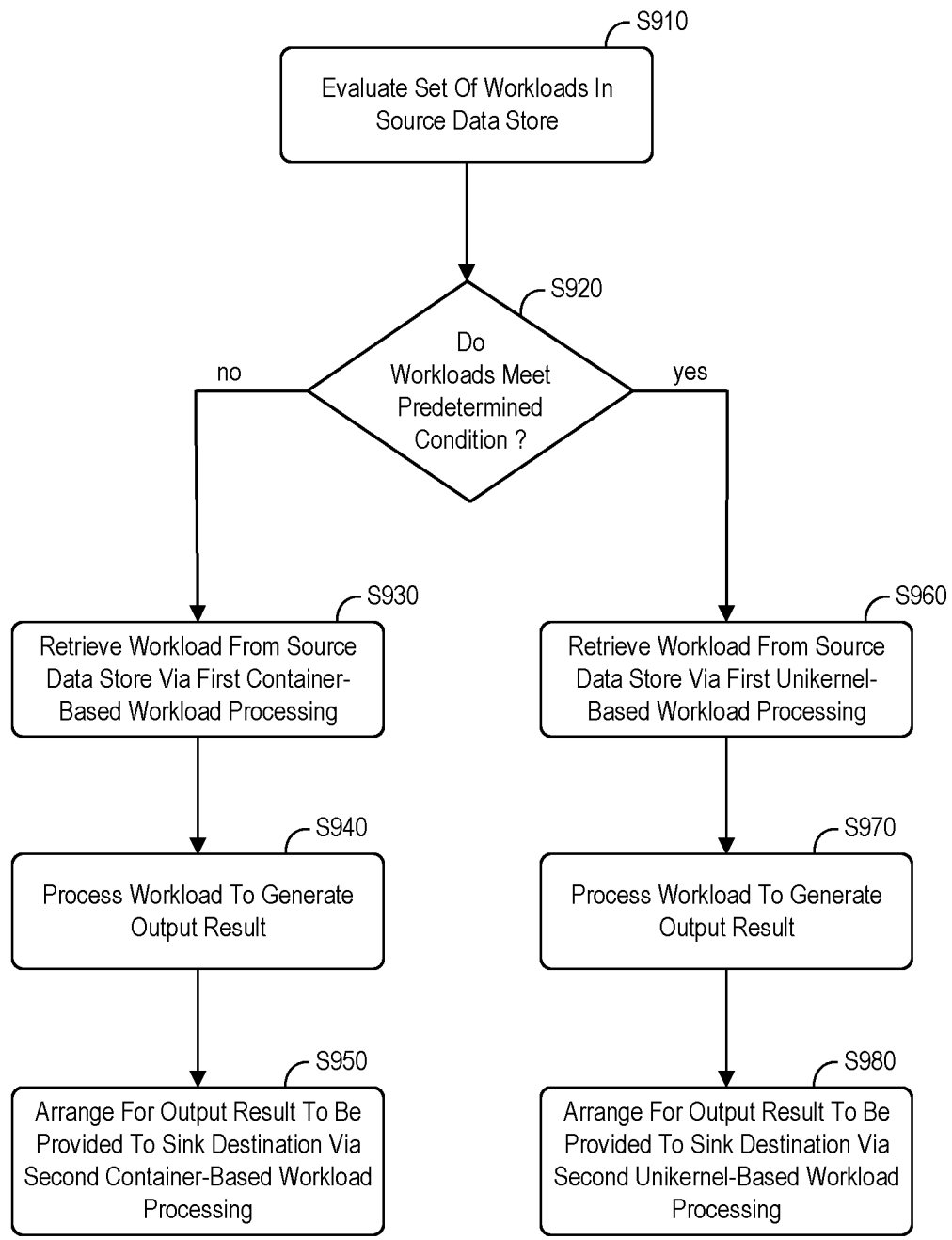
FIG. 9 is a method supporting both container and unikernel-based workload processing in accordance with some embodiments.

FIG. 9 is a method that might performed by some or all of the elements of any embodiment described herein. At S910, a workload in a source data store may be evaluated to determine if the workload meets a predetermined condition (e.g., is it an integration workflow?). If is determined that the workload does not meet the predetermined condition at S920, then a workload may be retrieved from a source data store via first container-based workload processing at S930. At S920, the workload is process result to generate an output result. At S930, it is arranged for the output result to be provided to a sink destination via second container-based workload processing.

If it is determined that the workload meets the predetermined condition at S920, then a workload may be retrieved from a source data store via first unikernel-based workload processing at S960. According to some embodiments, the workload is associated with an integration workflow (e.g., an IO packet accepted at a network stack). Note that the source data store might be associated with a first HTTP endpoint while the sink destination is associated with a different HTTP endpoint. At S970, the workload may be processed to generate an output result. According to some embodiments, the processing may be associated with filtering and/or dropping (e.g., in connection with packet processing). At S980, it may be arranged for the output result to be provided to the sink destination via second unikernel-based workload processing. According to some embodiments, the unikernel-based workload processing is associated with a Linux event loop model of IO multiplexing. Moreover, a per tenant approach may, according to some embodiments, let the processing platform build appropriate security primitives associated with the workload.

Figure 10:
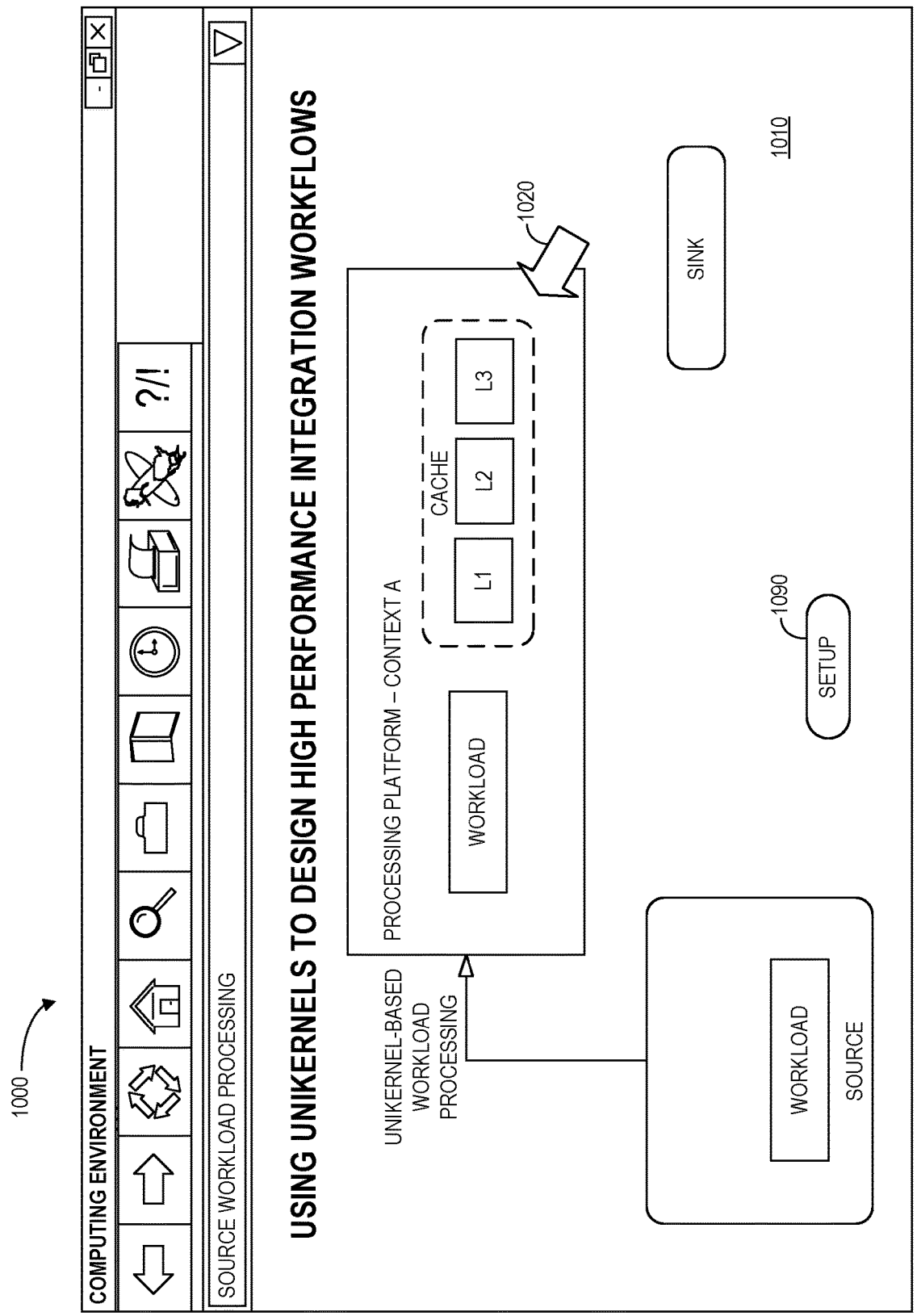
FIG. 10 is a human machine interface display according to some embodiments.

FIG. 10 is a human machine interface display 1000 associated with workload processing in accordance with some embodiments. The display 1000 includes a graphical representation 1010 of elements of a workload processing integration system. Selection of an element (e.g., via a touch-screen or computer pointer 1020) may result in display of a pop-up window containing various options (e.g., to adjust machine learning rules or logic, assign various devices, etc.). The display 1000 may also include a user-selectable "Setup" icon 1090 (e.g., to configure parameters for workload processing in accordance with any of the embodiments described herein).

Figure 11:
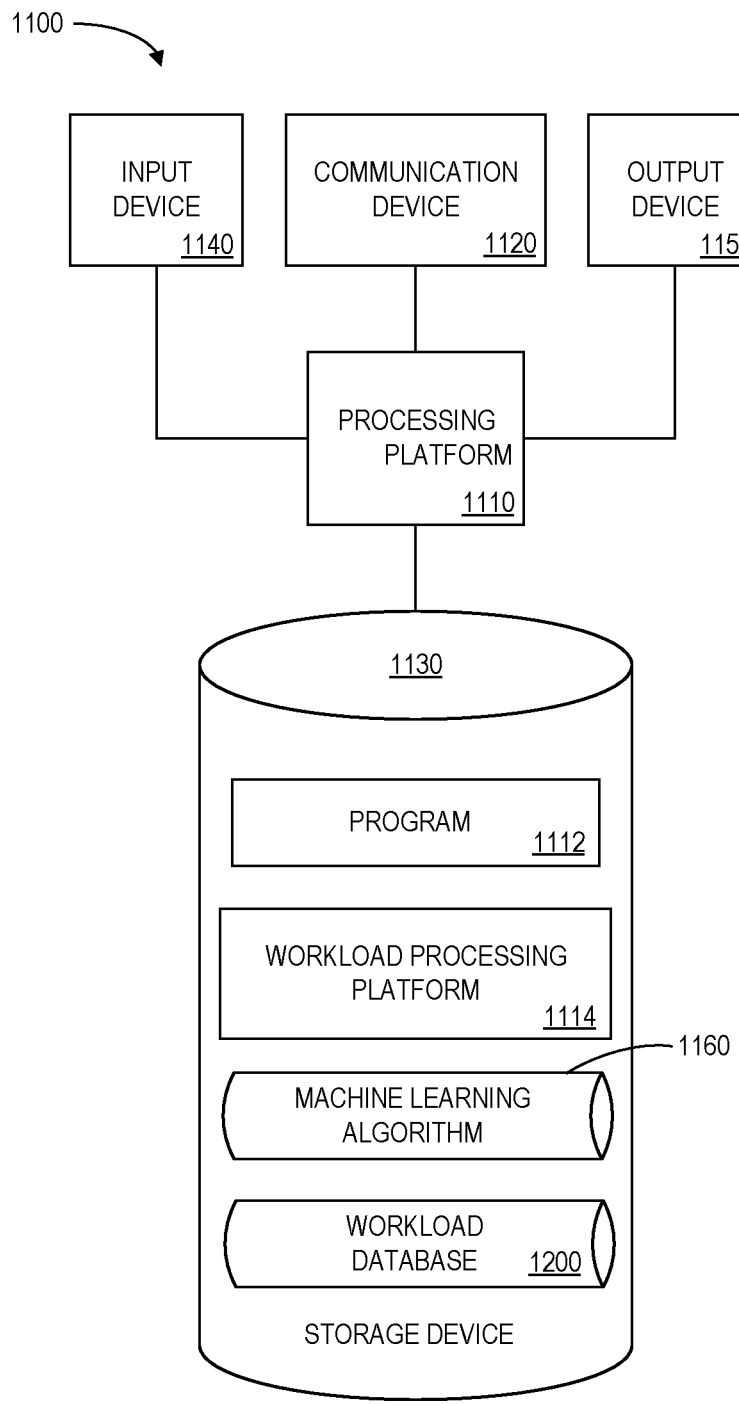
FIG. 11 is an apparatus or platform according to some embodiments.

Note that the embodiments described herein may be implemented using any number of different hardware configurations. For example, FIG. 11 is a block diagram of an apparatus or platform 1100 that may be, for example, associated with the integration system 400 of FIG. 4 (and/or any other system described herein). The platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote user platforms, cloud resource providers, etc. The platform 1100 further includes an input device 1140 (e.g., a computer mouse and/or keyboard to input machine learning rules or logic) and/an output device 1150 (e.g., a computer monitor to render a display, transmit recommendations, and/or create processing reports). According to some embodiments, a mobile device and/or PC may be used to exchange information with the platform 1100.

The processor 1110 also communicates with a storage device 1130. The storage device 1130 can be implemented as a single database or the different components of the storage device 1130 can be distributed using multiple databases (that is, different deployment information storage options are possible). The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or workload processing platform 1114 for controlling the processor 1110. The processor 1110 performs instructions of the programs 1112, 1114, and thereby operates in accordance with any of the embodiments described herein. For example, the processor 1110 may access a source data store that contains a plurality of workloads (e.g., data packets). The processor 1110 may retrieve a workload from the source data store via first unikernel-based workload processing. The processor 1110 may then process the workload (e.g., filtering or dropping) to generate an output result and arrange for the output result to be provided to a sink destination via second unikernel-based workload processing (e.g., associated with a Linux event loop model of input output multiplexing). In some embodiments, the processor 1110 initially evaluates the workload in the source data store to determine if the workload meets a predetermined condition. If the workload does not meet the predetermined condition, the retrieving and arranging may be performed via container-based workload processing instead of unikernel-based workload processing.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the platform 1100 from another device; or (ii) a software application or module within the platform 1100 from another software application, module, or any other source.

In some embodiments (such as the one shown in FIG. 11), the storage device 1130 further stores a machine learning algorithm 1160 and a workload database 1200. An example of a database that may be used in connection with the platform 1100 will now be described in detail with respect to FIG. 12. Note that the database described herein is only one example, and additional and/or different information may be stored therein. Moreover, various databases might be split or combined in accordance with any of the embodiments described herein.

Figure 12:
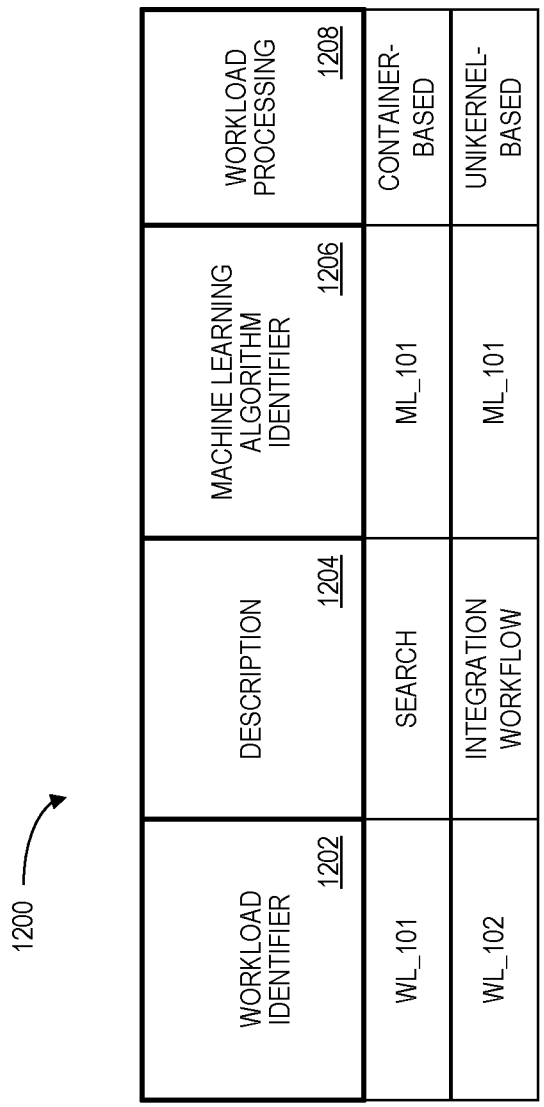
FIG. 12 illustrates a workload database in accordance with some embodiments.

Referring to FIG. 12, a table is shown that represents the workload database 1200 that may be stored at the platform 1100 according to some embodiments. The table may include, for example, entries that define packets of information to be processed by an integration system. The table may also define fields 1202, 1204, 1206, 1208, for each of the entries. The fields 1202, 1204, 1206, 1208 may, according to some embodiments, specify: a workload identifier 1202, a description 1204, a machine learning algorithm identifier 1206, and workload processing 1208. The workload database 1200 may be created and updated, for example, when a new workload packed is received or processed. According to some embodiments, the policy database 1200 may further store details about a data source or sink, a time of processing, etc.

The workload identifier 1202 might be a unique alphanumeric label or link that is associated with a particular packet of information to be processed. The description 1204 might describe the type of processing that is associated with the workload identifier 1202. The machine learning algorithm identifier 1206 may be alphanumeric code associated with a particular SVM, machine learning rule, etc. The workload processing 1208 might indicate which type of workload processing was determined to be appropriate for the workload identifier (e.g., container-based or unikernel-based).

Thus, embodiments may provide high performance workload processing in an automatic and efficient manner.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Figure 13:
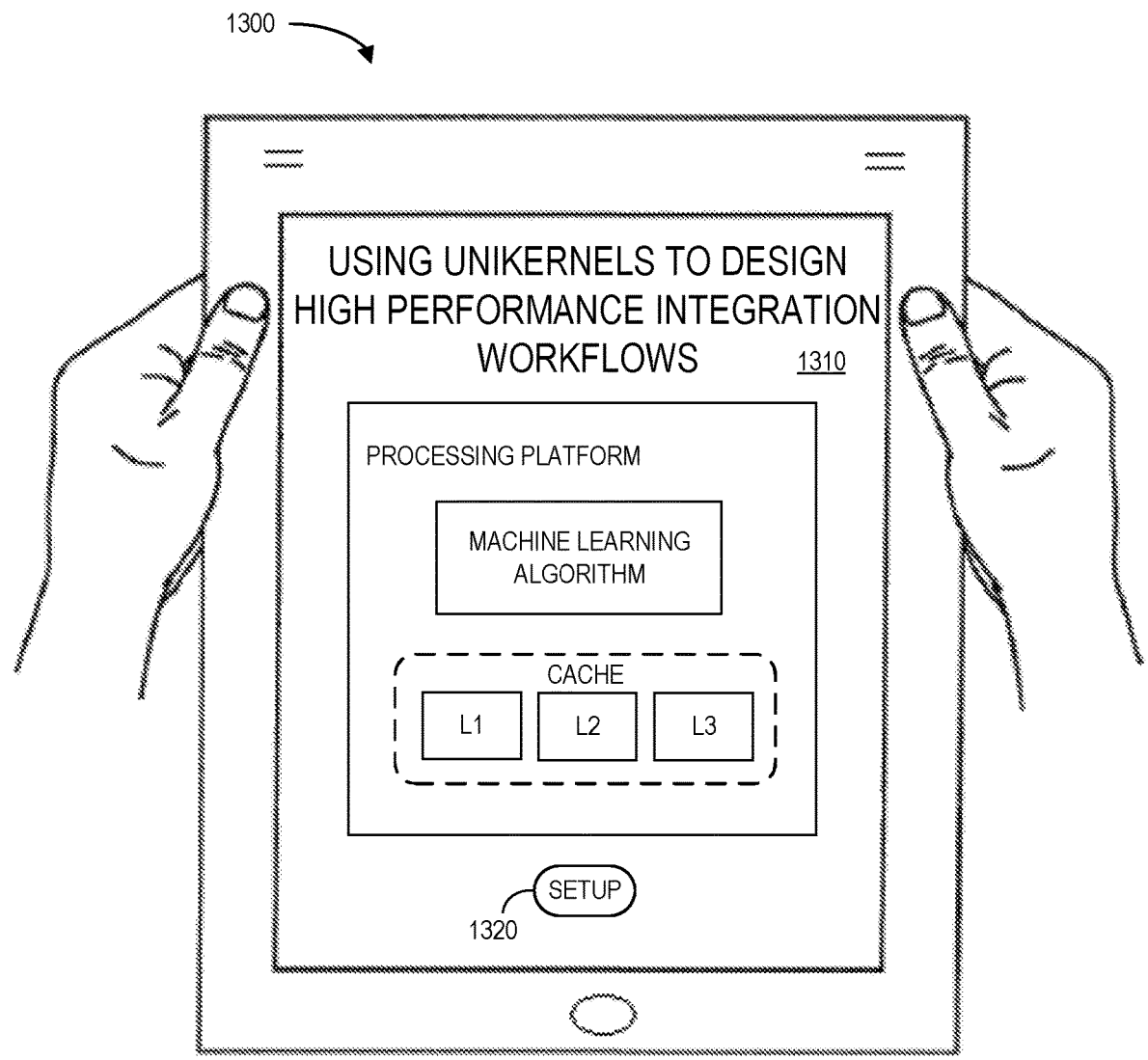
FIG. 13 illustrates a tablet computer according to some embodiments.

Although specific hardware and data configurations have been described herein, note that any number of other configurations may be provided in accordance with some embodiments of the present invention (e.g., some of the information associated with the databases described herein may be combined or stored in external systems). Moreover, although some embodiments are focused on particular types of database applications and services, any of the embodiments described herein could be applied to other types of applications and services. In addition, the displays shown herein are provided only as examples, and any other type of user interface could be implemented. For example, FIG. 13 shows a tablet computer 1300 rendering a workload processing display 1310. The display 1310 may, according to some embodiments, be used to view more detailed elements about components of the integration system (e.g., when a graphical element is selected via a touchscreen) or to configure operation of the integration system (e.g., to establish a new machine learning algorithm for the integration system via a "Setup" icon 1320).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

The invention claimed is:

1. An integration system, comprising:
   a source data store containing a plurality of workloads;
   a processing platform, coupled to the source data store, including:

a computer processor, and a memory storage device including instructions that when executed by the computer processor enable the integration system to:

evaluate a workload in the source data store to determine if the workload meets a predetermined condition, if the workload meets the predetermined condition:
retrieve the workload from the source data store via first unikernel-based workload processing,
process the workload to generate an output result, and
arrange for the output result to be provided to a sink destination via second unikernel-based workload processing, and if the workload does not meet the predetermined condition:
retrieve the workload from the source data store via first container-based workload processing,
process the workload to generate an output result, and
arrange for the output result to be provided to a sink destination via second container-based workload processing.

2. The integration system of claim 1, wherein the workload is associated with an integration workflow.

3. The integration system of claim 2, wherein the workload is associated with an input output packet accepted at a network stack.

4. The integration system of claim 2, wherein the source data store is associated with a first Hypertext Transfer Protocol ("HTTP") endpoint and the sink destination is associated with a second HTTP endpoint.

5. The integration system of claim 1, wherein the processing performed by the processing platform is associated with at least one of: (i) filtering, and (ii) dropping.

6. The integration system of claim 1, wherein the unikernel-based workload processing is associated with a Linux event loop model of input output multiplexing.

7. The integration system of claim 6, wherein the processing platform uses a per tenant approach to build appropriate security primitives associated with the workload.

8. The integration system of claim 1, wherein the evaluation is based on a machine learning algorithm.

9. A computer-implemented method, comprising:
evaluating, by a computer processor of a processing platform, a workload in a source data store to determine if the workload meets a predetermined condition;

if the computer processor of the processing platform determines that the workload does not meet the predetermined condition:
retrieving, by the computer processor of the processing platform, the workload from the source data store via first container-based workload processing,
processing, by the computer processor of the processing platform, the workload to generate an output result, and
arranging, by the computer processor of the processing platform, for the output result to be provided to a sink destination via second container-based workload processing; and if the computer processor of the processing platform determines that the workload meets the predetermined condition:
retrieving, by the computer processor of the processing platform, the workload from the source data store via first unikernel-based workload processing,
processing, by the computer processor of the processing platform, the workload to generate an output result, and
arranging, by the computer processor of the processing platform, for the output result to be provided to the sink destination via second unikernel-based workload processing.

10. The method of claim 9, wherein the workload is associated with an integration workflow.

11. The method of claim 10, wherein the workload is associated with an input output packet accepted at a network stack.

12. The method of claim 10, wherein the source data store is associated with a first Hypertext Transfer Protocol ("HTTP") endpoint and the sink destination is associated with a second HTTP endpoint.

13. The method of claim 9, wherein the processing performed by the processing platform is associated with at least one of: (i) filtering, and (ii) dropping.

14. The method of claim 9, wherein the unikernel-based workload processing is associated with a Linux event loop model of input output multiplexing.

15. The method of claim 14, wherein the processing platform uses a per tenant approach to build appropriate security primitives associated with the workload.

16. A non-transitory, computer-readable medium storing instructions that, when executed by a computer processor, cause the computer processor to perform a method, the method comprising:
evaluating, by a machine learning algorithm a computer processor of a processing platform, a set of workloads in a source data store to determine if the set of workloads meets a predetermined condition;

if the computer processor of the processing platform determines that the set of workloads does not meet the predetermined condition:
retrieving, by the computer processor of the processing platform, a workload from the source data store via first container-based workload processing,
processing, by the computer processor of the processing platform, the workload to generate an output result, and
arranging, by the computer processor of the processing platform, for the output result to be provided to a sink destination via second container-based workload processing; and if the computer processor of the processing platform determines that the set of workloads meets the predetermined condition:
retrieving, by the computer processor of the processing platform, the workload from the source data store via first unikernel-based workload processing,
processing, by the computer processor of the processing platform, the workload to generate an output result, and
arranging, by the computer processor of the processing platform, for the output result to be provided to the sink destination via second unikernel-based workload processing.

17. The medium of claim 16, wherein the workload is associated with an integration workflow.

18. The medium of claim 17, wherein the workload is associated with an input output packet accepted at a network stack.

19. The medium of claim 17, wherein the source data store is associated with a first Hypertext Transfer Protocol ("HTTP") endpoint and the sink destination is associated with a second HTTP endpoint.

\* \* \* \* \*